United States Patent [19]

Brandenburg, Jr.

[11] 4,352,456
[45] Oct. 5, 1982

[54] CAB HEATING SYSTEM

[75] Inventor: Lloyd W. Brandenburg, Jr., Wausau, Wis.

[73] Assignee: J. I. Case Company, Racine, Wis.

[21] Appl. No.: 157,878

[22] Filed: Jun. 9, 1980

[51] Int. Cl.$^3$ ............................................. B60H 1/02
[52] U.S. Cl. ................................. 237/12.3 R; 122/26; 126/247
[58] Field of Search ..................... 237/12.3 R; 60/618, 60/648, 456; 122/26; 126/247

[56] References Cited

U.S. PATENT DOCUMENTS

| | | | |
|---|---|---|---|
| 2,118,884 | 5/1938 | Fuchs | 257/7 |
| 3,112,002 | 11/1963 | van der Lely | 180/54 |
| 3,214,100 | 10/1965 | Aronson et al. | 237/12.1 |
| 3,259,317 | 7/1966 | Aronson et al. | 237/12.1 |
| 3,909,961 | 10/1975 | Lamer et al. | 37/135 |
| 4,192,456 | 3/1980 | Shields et al. | 237/12.3 R |
| 4,197,712 | 4/1980 | Zwick et al. | 62/53 |
| 4,211,364 | 7/1980 | Sickler | 237/12.3 A |

FOREIGN PATENT DOCUMENTS 766350 3/1933 France .

*Primary Examiner*—Ronald C. Capossela
*Attorney, Agent, or Firm*—Dressler, Goldsmith, Shore, Sutker & Milnamow, Ltd.

[57] ABSTRACT

A cab heating system for material handling equipment which maximizes energy savings by utilizing the heat generated during hydraulic operation. The cab heating system has a hydraulic control unit which controls a material handling implement. A heat exchanger is positioned downstream of the hydraulic control unit. Air flowing through the heat exchanger is heated by the hydraulic fluid and blown by a fan into the interior of the cab. The heating system can also have an auxiliary heat exchanger to further heat the hydraulic fluid. In one embodiment, the auxiliary heat exchanger utilizes engine coolant heated by the vehicle's engine. In another embodiment, the auxiliary heat exchanger utilizes hot exhaust gases from the vehicle's engine. A cooler can be provided to cool the hydraulic fluid. A control valve assembly with a temperature sensor can also be provided to sense the temperature of the hydraulic fluid entering the control valve assembly and to direct the hydraulic fluid to the auxiliary heat exchanger when the temperature of the hydraulic fluid is below a predetermined level or to the cooler when the temperature of the hydraulic fluid is above the predetermined level.

17 Claims, 4 Drawing Figures

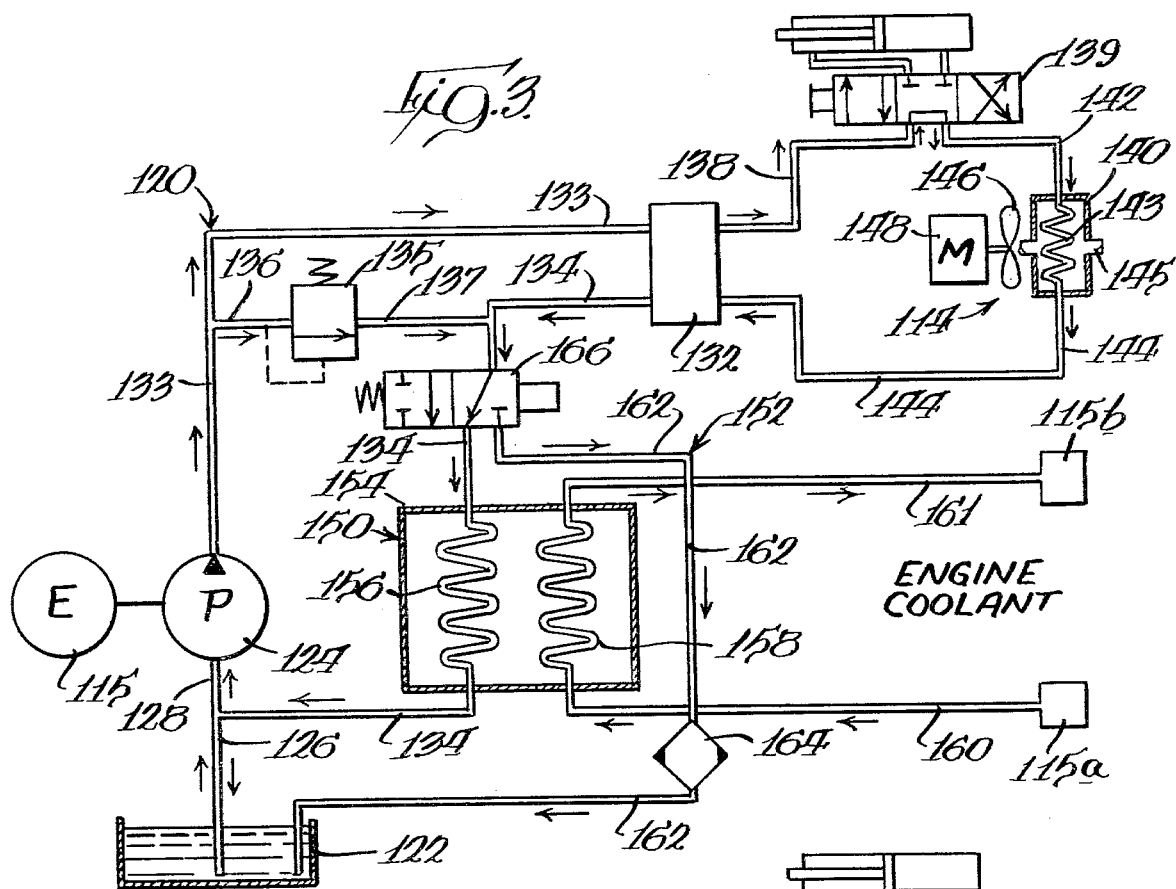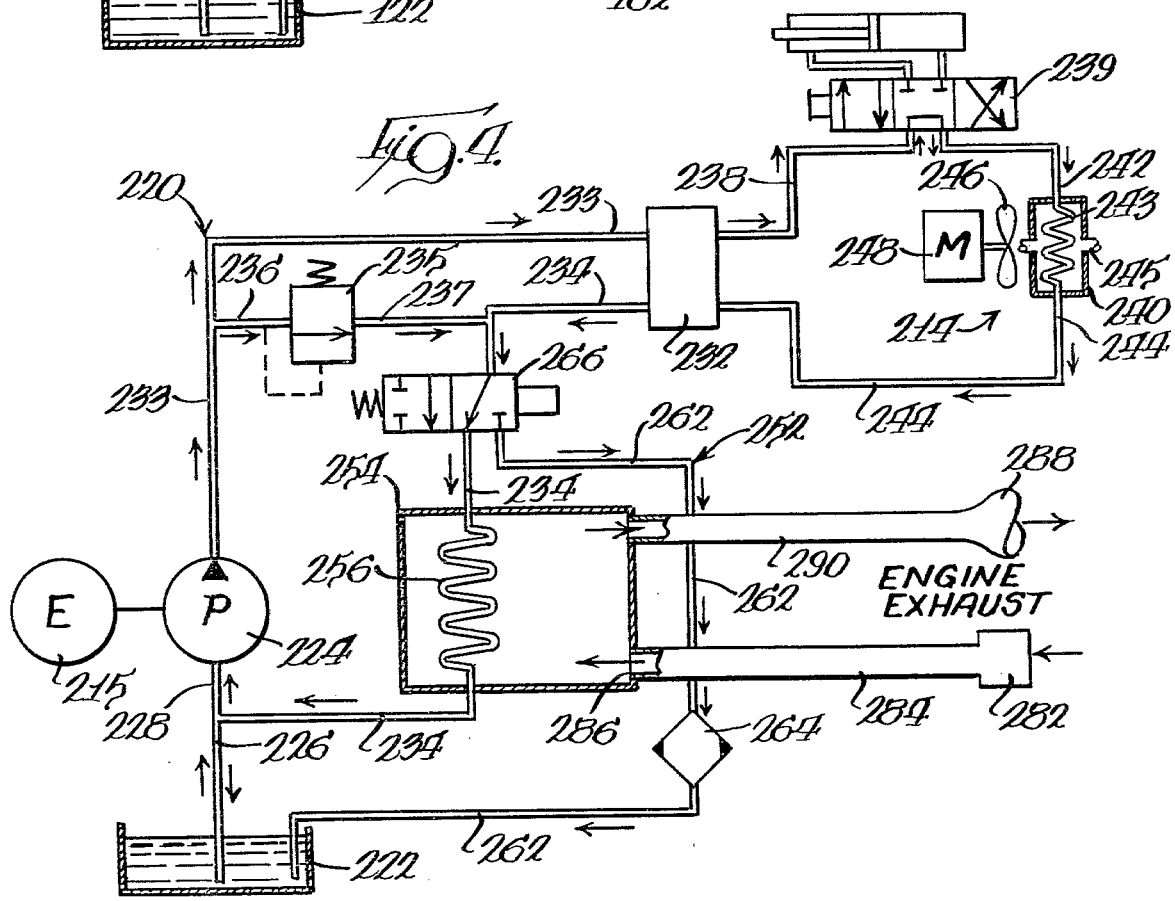

CAB HEATING SYSTEM

DESCRIPTION

1. Technical Field of Invention

This invention relates to a cab heater, and more particularly, to a cab heating system for material handling equipment, such as tractors, cranes, backhoes and the like.

2. Background of the Invention

Over the years, a variety of heating systems have been developed for heating enclosed areas and cabs of material handling equipment. Typifying such prior art heating systems are those found in U.S. Pat. Nos. 2,118,884, 3,112,002, 3,214,100, 3,259,317, 3,909,961 and 4,192,456 and French Pat. No. 766,350. These prior art heating systems have met with varying degrees of success. One particularly advantageous cab heating system is disclosed in U.S. application, Ser. No. 884,256 now U.S. Pat. No. 4,211,364 assigned to J. I. Case Company, the assignee of the present invention.

In some types of prior art heating systems, fuel-fired heaters heat the interior of a cab. Fuel-fired heaters are inherently dangerous and sometimes emit both flame and fuel odors which are unpleasant and detrimental to the health of the operator.

It is therefore desirable to provide an improved cab heating system which is safe and effective.

SUMMARY OF THE INVENTION

An improved cab heating system is provided for material handling equipment, such as tractors, cranes, backhoes, excavators, fork lift trucks, pile drivers, straddle carriers, concrete placers, tree harvesters, trucks, graders, bulldozers and the like, which is safe, effective and efficient.

Desirably, the novel cab heating system provides economical energy utilization by utilizing the heat produced in the equipment's existing hydraulic lines and components caused by fluid friction and normal flow restriction of circulating hydraulic fluid and hydraulic operation of the equipment. To this end, heated hydraulic fluid is directed from a hydraulic control unit, which controls the material handling implement and/or rotation of the cab, to a heat exchanger. Air flowing through the heat exchanger is heated by the heated hydraulic fluid and blown into the interior of the cab by a fan.

The novel heating system can also be equipped with an auxiliary heating assembly to further heat the hydraulic fluid in the circuit. In one embodiment, the auxiliary heating assembly utilizes engine coolant heated by the vehicle's engine to heat the hydraulic fluid. In another embodiment, the auxiliary heating assembly utilizes exhaust gases from the vehicle's engine to heat the hydraulic fluid.

A bypass system can also be provided to selectively bypass the auxiliary heating assembly when the temperature of the hydraulic fluid in the circuit is above a predetermined level. The bypass system has a sensor which senses the temperature of the hydraulic fluid and a control valve which directs the hydraulic fluid to an auxiliary heat exchanger when the sensed temperature is below a preselected level and to a cooler when the sensed temperature is at or above the preselected temperature.

A more detailed explanation of the invention is provided in the following description and appended claims taken in conjunction with the accompanying drawings.

BRIEF DESCRIPTION OF THE DRAWINGS

FIG. 3 is a circuit diagram of another heating system in accordance with principles of the present invention; and FIG. 4 is a circuit diagram of a further cab heating system in accordance with the principles of the present invention.

DETAILED DESCRIPTION OF THE PREFERRED EMBODIMENTS

Figure 1:
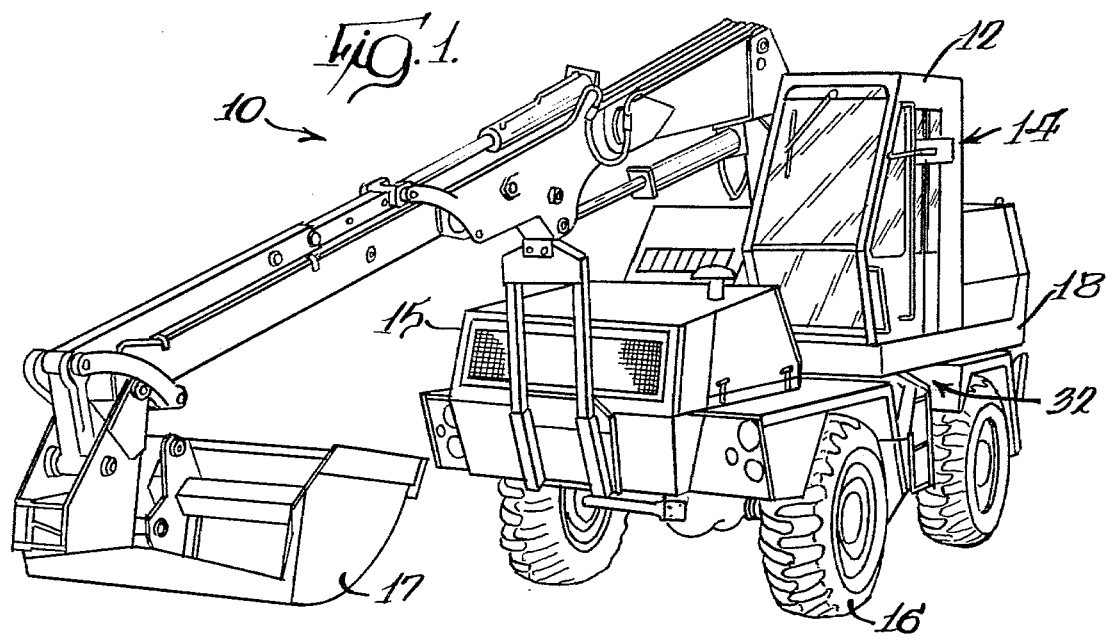
FIG. 1 is a perspective view of a construction vehicle equipped with a cab heating system in accordance with principles of the present invention.

Referring now to FIG. 1 of the drawings, hydraulically equipped material handling equipment, such as a construction vehicle 10 has a cab or operator's compartment 12 which is heated by a hydraulic cab heating system 14. Vehicle 10 has an engine 15 which provides a power plant to propel wheels 16 or crawler tracks in the case of a tracked vehicle and has at least one power-driven hydraulically-operated material handling implement 17 which is remotely operable from the interior of cab 12.

In the embodiment shown, cab 12 is mounted upon a support structure or slewing platform 18 which rotates 360 degrees to a desired position about an upright axis. Support structure 18 is connected to a hydraulic swivel 32 which forms part of a hydraulic circuit 20 (FIG. 2).

Figure 2:
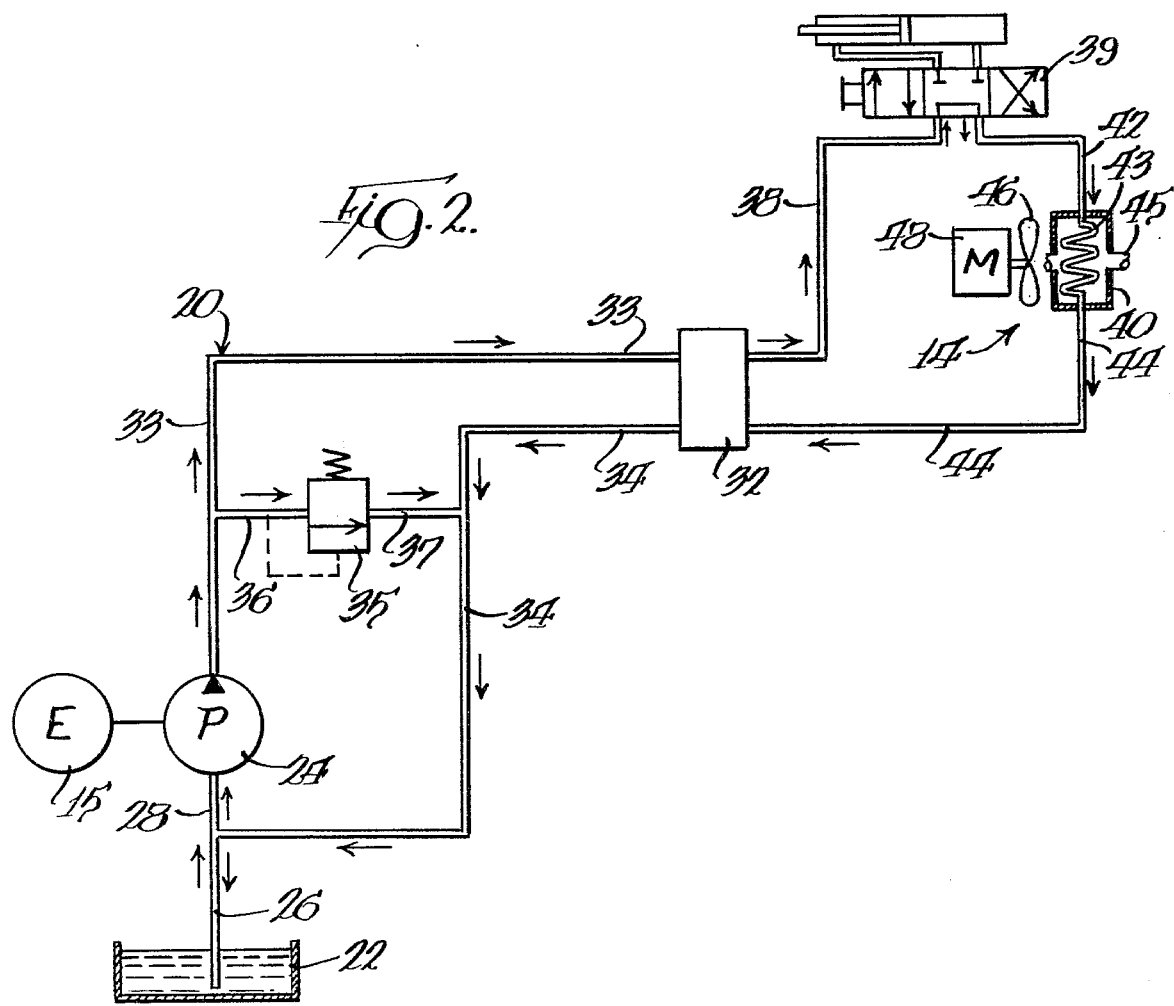
FIG. 2 is a circuit diagram of the preferred cab heating system.

As shown in FIG. 2, a tank or reservoir 22 (FIG. 2) supplies hydraulic fluid to circuit 20 which is circulated by a pump 24. Pump 24 is driven by engine 15 and is connected to tank 22 by inlet lines 26 and 28. Pump outlet line 33 and return lines 34 and 28 connect pump 24 to hydraulic swivel 32. A pressure relief valve 35 is connected to outlet and return lines 33 and 34 via relief lines 36 and 37.

In order to selectively control rotation of the support structure 18 upon which cab 12 is mounted, a cab operated hydraulic control unit 39 (FIG. 2), such as a steering orbital control assembly, is provided. In the preferred embodiment, hydraulic control unit 39 also includes controls for selectively controlling movement of material handling implement 17 (FIG. 1). Hydraulic control unit 39 is connected to hydraulic swivel 32 via a hydraulic line 38 and is connected to a heat exchanger 40 via a hydraulic line 42. Heat exchanger 40 is connected to hydraulic swivel 32 via a hydraulic line 44.

In the preferred embodiment, heat exchanger 40 is positioned downstream of hydraulic control unit 39 and is located in proximity to cab 12. Heat exchanger 40 has a hydraulic fluid flow passageway 43 (FIG. 2) and at least one air flow passageway 45 which communicates with the interior of cab 12. Air flowing through the air flow passageway 45 of heat exchanger 40 is blown into the interior of cab 12 by a fan 46, which is driven by motor 48.

In operation, hydraulic fluid is pumped around circuit 20 in the direction of the arrows shown in FIG. 2. The support structure 18 (FIG. 1) upon which the cab 12 is mounted, as well as the material handling implement 17, are operated from the cab 12 by hydraulic control unit 39. Hydraulic fluid flowing in circuit 20 generates heat and increases in temperature during circulation of the hydraulic fluid through circuit 20 by fluid friction and normal flow restriction in the lines and parts of the circuit and in response to operation of the hydraulic control unit 39. Air flowing through the air flow passageway 45 of heat exchanger 40 is heated by the heated hydraulic fluid flowing through passageway 43 of heat exchanger 40 and is propelled into the interior of cab 12 by fan 46.

Referring now to the cab heating system 114 of FIG. 3, heating system 114 is substantially similar to cab heating system 14 of FIGS. 1 and 2, except that it is also equipped with an auxiliary heating assembly or system 150 for heating the hydraulic fluid in circuit 120 and a bypass circuit assembly 152 for selectively bypassing the auxiliary heating assembly 150 when the temperature of the hydraulic fluid is above a predetermined amount. For ease of understanding and for clarity, similar parts and components of cab heating system 114 (FIG. 3) have been given part numbers similar to the parts and components of cab heating system 14 (FIGS. 1 and 2), but increased by an amount of 100, such as pump 124, hydraulic swivel 132, fan 146, etc.

In the embodiment of FIG. 3, auxiliary heating system 150, located between hydraulic swivel 132 and pump 124, utilizes engine coolant heated by vehicle engine 115 to heat the hydraulic fluid in the primary return line 134. Auxiliary heating assembly 150 has an auxiliary heat exchanger 154 with an hydraulic fluid passageway 156 through which hydraulic fluid in the primary return line 134 of hydraulic circuit 120 passes and has at least one engine coolant passageway 158 through which engine coolant in auxiliary line 160 passes. Auxiliary line 160 carries engine coolant from engine heat 115a of engine 115 to passageway 158 and thereupon to engine block 115b via return line 161.

Bypass auxiliary heating assembly 150 has a control valve assembly 166, such as a three position fluid control valve with a sensor which senses the temperature of hydraulic fluid entering the valve assembly. Valve assembly 166 automatically directs hydraulic fluid through heat exchanger passageway 156 when the temperature of the hydraulic fluid entering valve assembly 166 is below a preselected level. When the temperature is at or above the preselected level, valve assembly 166 automatically directs the hydraulic fluid through a bypass line 162 to a fluid cooler or auxiliary bypass heat exchanger 164 which cools the hydraulic fluid passing therethrough to a desired temperature. Cooler 164 and bypass line 162 are connected in parallel to auxiliary heat exchanger 154 to selectively bypass auxiliary heat exchanger 154.

Cab heating system 114 (FIG. 3) operates substantially the same as cab heating system 14 (FIGS. 1 and 2), except that it has an auxiliary heating assembly 150 and a bypass circuit assembly 152. Auxiliary heating assembly 150 preheats the hydraulic fluid in circuit 120 before the fluid returns to pump 124 when the hydraulic fluid is directed through passageway 156 of auxiliary heat exchanger 154 by valve assembly 166 in response to the hydraulic fluid temperature at the inlet of valve assembly 166 being below a predetermined level. Valve assembly 166 routes hydraulic fluid in circuit 120 through bypass line 162 to cooler 164 and tank 122 when the temperature of the hydraulic fluid at the inlet of valve assembly 166 is at or above the predetermined level. Bypass circuit 152, thereby, provides a hydraulic fluid temperature control system which maintains the temperature of the hydraulic fluid in circuit 120 below the inlet temperature of valve assembly 166.

Referring now to the cab heating system 214 shown in FIG. 4, heating system 214 is substantially similar to heating system 114 of FIG. 3, except that the auxiliary heating assembly or system 250 of FIG. 4 is constructed and arranged to utilize hot exhaust gases from the exhaust 282 of vehicle engine 215 to heat the hydraulic fluid in primary return line 234. To this end, auxiliary heating assembly 250 has an auxiliary gas exhaust line 284 which directs exhaust gases from engine exhaust 282 through an exhaust gas passageway 286 in auxiliary heat exchanger 254 and thereupon to muffler 288 via return line 290.

The other parts and components of heating system 214 (FIG. 4) are substantially similar to the parts components of heating system 114 (FIG. 3). For ease of understanding and for clarity, similar parts and components of heating system 214 have been given part numbers similar to the parts and components of heating system 114 (FIG. 3), but increased by an amount of 100 so as to be in the 200 series, such as pump 224, fan 246, fluid cooler 264, etc.

Cab heating system 214 (FIG. 4) operates substantially the same as cab heating system 114 (FIG. 3), except that hot exhaust gases instead of heated engine coolant preheat the hydraulic fluid in circuit 220 before it reaches the inlet of pump 224.

The heating systems 14, 114, and 214 described above, can be used with existing hydraulic systems for conservation of energy and efficient utilization of heat generated by hydraulic fluid in the circuit during operation. This provides an improved, efficient, economical and effective way to heat the cab.

Although embodiments of the invention have been shown and described, it is to be understood that various modifications and substitutions can be made by those skilled in the art without departing from the novel spirit and scope of the invention.

What is claimed is:

1. A cab heating system, comprising: a cab providing an operator compartment, at least one material handling implement remotely operable from said cab, a hydraulic circuit having hydraulic fluid circulating therethrough, said hydraulic circuit including hydraulic control means for selectively controlling movement of said material handling implement from said cab, a tank for supplying said hydraulic fluid and pump means for circulating said hydraulic fluid, said hydraulic fluid being heated by fluid friction during circulation and in response to operation of said hydraulic control means, a heat exchanger in proximity to said cab having a hydraulic fluid flow passageway in fluid communication with said hydraulic control means and at least one air flow passageway in communication with the interior of said cab, said heated hydraulic fluid flowing through said hydraulic fluid flow passageway and heating air flowing through said air flow passageway and fan means for propelling said heated air into the interior of said cab.

2. A cab heating system in accordance with claim 1 further including auxiliary heating means for heating said hydraulic fluid in said hydraulic circuit, said auxiliary means including an auxiliary heat exchanger in fluid communication with said pump means.

3. A cab heating system in accordance with claim 2 wherein said hydraulic circuit includes bypass means in fluid communication with said tank for bypassing said auxiliary heat exchanger, temperature sensing means for sensing the temperature of said hydraulic fluid in said circuit and control valve means operatively associated with said temperature sensing means for directing said hydraulic fluid to said auxiliary heat exchanger when the hydraulic fluid temperature being sensed is below a preselected temperature and for directing said hydraulic fluid to said bypass means when the hydraulic fluid temperature being sensed is above said preselected temperature.

4. A cab heating system in accordance with claim 3 further including cooling means connected to said bypass means for cooling said hydraulic fluid.

5. A cab heating system in accordance with claim 2 wherein said auxiliary heat exchanger has an engine coolant passageway and said auxiliary heating means includes heated engine coolant flowing through said engine coolant passageway.

6. A cab heating system in accordance with claim 2 wherein said auxiliary heat exchanger has an engine exhaust passageway and said auxiliary heating means includes engine exhaust gases flowing through said engine exhaust passageway.

7. A cab heating system, comprising: a cab providing an operator compartment, at least one material handling implement remotely operable from said cab, a hydraulic circuit having hydraulic fluid circulating therethrough, said hydraulic circuit including hydraulic control means for selectively controlling movement of said material handling implement from said cab, said hydraulic fluid being heated by fluid friction during circulation and in response to operation of said hydraulic control means, a heat exchanger having a hydraulic fluid flow passageway in fluid communication with said hydraulic control means and at least one air flow passageway in communication with the interior of said cab, said heated hydraulic fluid flowing through said hydraulic fluid flow passageway and heating air flowing through said air flow passageway and means for propelling said heated air into the interior of said cab.

8. A cab heating system in accordance with claim 7 further including a support structure upon which said cab is rotated, said hydraulic control means including rotation control means for controlling rotation of said support structure, said hydraulic fluid being heated in response to rotation of said support structure.

9. A cab heating system in accordance with claim 7 further including auxiliary heating means for heating said hydraulic fluid.

10. A cab heating system in accordance with claim 9 wherein said auxiliary heating means includes heated engine coolant.

11. A cab heating system in accordance with claim 9 wherein said auxiliary heating means includes engine exhaust gases.

12. A cab heating system in accordance with claim 9 further including bypass means for selectively bypassing said auxiliary heating means.

13. A cab heating system in accordance with claim 12 further including cooling means connected to said bypass means for cooling said hydraulic fluid.

14. A cab heating system in accordance with claim 7 further including temperature control means for maintaining the temperature of said hydraulic fluid in said circuit below a predetermined level.

15. A heating system for a revolving cab of a vehicle, comprising: a cab providing an operator compartment, a rotatable support structure upon which said cab is mounted, an engine providing a power plant for driving said vehicle, at least one material handling implement remotely operable from said cab, a hydraulic circuit having a hydraulic fluid circulating therethrough, said hydraulic circuit including a tank providing a reservoir for supplying said hydraulic fluid, a pump driven by said engine for circulating said hydraulic fluid, a hydraulic swivel operatively connected to said support structure, hydraulic control means operable from said cab for selectively controlling movement of said material handling implement and rotation of said support structure upon which said cab is mounted, said hydraulic fluid being heated by fluid friction during circulation and in response to operation of said hydraulic control means, a heat exchanger in proximity to said cab having a hydraulic fluid flow passageway in communication with and positioned downstream of said hydraulic control means and at least one air flow passageway communicating with the interior of said cab, said heated hydraulic fluid flowing through said hydraulic fluid flow passageway and heating air flowing through said air flow passageway and fan means for propelling said heated air into the interior of said cab.

16. A heating system for a revolving cab of a vehicle, comprising: a cab providing an operator compartment, a rotatable support structure upon which said cab is mounted, an engine providing a power plant for driving said vehicle, at least one material handling implement remotely operable from said cab, a hydraulic circuit having a hydraulic fluid circulating therethrough, said hydraulic circuit including a tank providing a reservoir for supplying said hydraulic fluid, a pump driven by said engine for circulating said hydraulic fluid, a hydraulic swivel operatively connected to said support structure, hydraulic control means operable from said cab for selectively controlling movement of said material handling implement and rotation of said support structure upon which said cab is mounted, said hydraulic fluid being heated by fluid friction during circulation and in response to operation of said hydraulic control means, a heat exchanger in proximity to said cab having a hydraulic fluid flow passageway positioned downstream of said hydraulic control means and at least one air flow passageway communicating with the interior of said cab, said heated hydraulic fluid flowing through said hydraulic fluid flow passageway and heating air flowing through said air flow passageway, fan means for propelling said heated air into the interior of said cab, a second heat exchanger positioned upstream of said pump, said second heat exchanger having a hydraulic fluid flow passageway and an engine coolant passageway, hot engine coolant flowing from said engine through said engine coolant passageway for heating hydraulic fluid in said hydraulic fluid flow passageway of said second heat exchanger, cooling means positioned upstream of said tank and connected in parallel to said second heat exchanger for cooling said hydraulic fluid, and control valve means positioned upstream of said second heat exchanger, said control valve means having temperature sensing means for sensing the temperature of said hydraulic fluid entering said control valve means and directing said hydraulic fluid to said hydraulic fluid flow passageway of said second heat exchanger in response to said temperature sensing means sensing a hydraulic fluid temperature below a preselected value and to said cooling means in response to said temperature sensing means sensing a hydraulic fluid temperature above said preselected value.

17. A heating system for a revolving cab of a vehicle, comprising: a cab providing an operator compartment, a rotatable support structure upon which said cab is mounted, an engine providing a power plant for driving said vehicle, at least one material handling implement remotely operable from said cab, a hydraulic circuit having a hydraulic fluid circulating therethrough, said hydraulic circuit including a tank providing a reservoir for supplying said hydraulic fluid, a pump driven by said engine for circulating said hydraulic fluid, a hydraulic swivel operatively connected to said support structure, hydraulic control means operable from said cab for selectively controlling movement of said material handling implement and rotation of said support structure upon which said cab is mounted, said hydraulic fluid being heated by fluid friction during circulation and in response to operation of said hydraulic control means, a heat exchanger in proximity to said cab having a hydraulic fluid flow passageway positioned downstream of said hydraulic control means and at least one air flow passageway communicating with the interior of said cab, said heated hydraulic fluid flowing through said hydraulic fluid flow passageway and heating air flowing through said air flow passageway, fan means for propelling said heated air into the interior of said cab, a second heat exchanger positioned upstream of said pump, said second heat exchanger having a hydraulic fluid flow passageway and an engine exhaust passageway, engine exhaust gases from said engine for heating said hydraulic fluid in said hydraulic fluid flow passageway of said second heat exchanger, cooling means positioned upstream of said tank and connected in parallel to said second heat exchanger for cooling said hydraulic fluid and control valve means positioned upstream of said second heat exchanger, said control valve means having temperature sensing means for sensing the temperature of said hydraulic fluid entering said control valve means and directing said hydraulic fluid to said fluid flow passageway of said second heat exchanger when the sensed temperature of said hydraulic fluid is below a preselected value and to said cooling means when said sensed temperature of said hydraulic fluid is above said preselected value.

* * * * *